Patented Aug. 24, 1937

2,090,617

UNITED STATES PATENT OFFICE 2,090,617

VITREOUS ENAMEL ORGANOSOLS

Rudolph S. Bley, Elizabethton, Tenn., assignor to The Porcelain Enamel and Manufacturing Company of Baltimore, Baltimore, Md., a corporation of Maryland No Drawing. Application December 31, 1935, Serial No. 56,908

15 Claims. (Cl. 106—36.2)

The present invention relates to the production of vitreous enamel organosols which may be applied to metal bases by spraying, dipping, etc.

One object of my invention has to do with a vitreous enamel organosol, the liquid phase of which comprises an organic silicon compound.

Another object of my invention relates to the production of vitreous enamel organosols, the solid phase of which is dispersed in an aromatic silicon compound.

A third object of my invention has to do with a vitreous enamel organosol comprising a finely divided vitreous enamel frit dispersed in a liquid alkyl derivative of silicon.

A fourth object of the present invention relates to the manufacture of finely divided, vitreous enamel frit dispersed in tetraethyl-monosilane with or without the assistance of a protective colloid.

A fifth object of this invention has to do with the addition of protective colloids to the organosols, set forth above, to promote floating of the solid phase in the liquid phase of the organosol.

Other objects of my invention will become apparent to those skilled in the art from a study of the following specification.

Vitreous enamel, in reality a glass composition of a relatively low fusibility, is principally composed of silicates, borates, fluorides, etc. In producing such vitreous enamel, so-called "glass-forming" substances are mixed with "auxiliary" substances in certain definite proportions to form a composition which, subsequently, is fused and quenched in water. The product, obtained after quenching, is called in the art "enamel frit". This frit is ground in water, containing clay, to a fine composition, the so-called "vitreous enamel slip" which may be applied to metal bases by spraying or dipping.

The aforementioned glass-forming substances are the following:

(1) Raw materials for introducing acid oxides (silicon, boron)

(2) Raw materials for introducing basic oxides (soda, potash, lime, magnesia, lead oxide, etc.)

(3) Raw materials for introducing acid and basic oxides (borax, fluorspar, kaolin, etc.)

The auxiliary substances, set forth above, are the following:

(1) Oxidizing agents (sodium nitrate, etc.)
(2) Adhering oxides (cobalt, nickel, manganese oxides, etc.)
(3) Opacifiers (phosphates, fluorides, pigments, etc.)

Heretofore, vitreous enamel slips have been prepared by milling enamel frit with water containing about 7% of clay to a fine consistency, said clay being added to float the frit particles by hydration. This method, however, is unsatisfactory for the reason that frit particles give off a number of alkaline compounds in the presence of water. These alkaline compounds thin out the clay of the enamel slips, and as a result the clay loses its floating property. Thus, the frit and clay particles settle in very short periods of time, and it becomes impossible to maintain a proper consistency of the enamel slip. A number of methods have been introduced to maintain or restore the consistency of enamel slips, i. e., enamel hydrosols. Acid salts, for example, magnesium sulphate, are added to enamel slips to neutralize the alkaline compounds generated by the frit particles. Although the colloidal magnesium hydroxide, produced by chemical interaction of magnesium sulphate and said alkaline compounds, somewhat assists in floating enamel particles, this so-called "setting up" of aqueous enamel slips has proven unsatisfactory. Another method consists in adding buffer solutions to vitreous enamel slips to neutralize the alkalis, originating from the frit particles, to maintain the original, optimum pH values of such slips. Although this method, set forth in my application, Ser. No. 548,712, filed July 3, 1931, gives satisfactory results, I have found that it is extremely difficult to permanently set up a "stainless" enamel frit ground in water. In addition, such enamel hydrosols form rust on metal bases to which they are applied before firing, and as a results of such rusting so-called mottled coatings are obtained. Experimentation with enamel hydrosols proved that such rusting of metal bases is caused by the alkaline compounds dissociating in the presence of water to active anions and cations. To completely overcome this deficiency, it is necessary to disperse frit particles in non- or very little conducting, organic liquids. In this manner the troublesome OH groups of alkalis are eliminated, i. e. inactivated.

I am well aware that it has heretofore been proposed to suspend special types of enamels in oils, and to fuse such oil-enamel suspensions on metal bases, such as silver, gold, etc. However, I have found this method to be unsatisfactory for enameling iron, steel, etc., for the reason that oils burn out with the formation of gases and finely divided soot. The gases and soot, escaping from the enamel coating upon fusing, tend to cause the formation of uneven enamel coatings covered with so-called "pin-holes". Unexpectedly, I have found by experimentation that excellent, even vitreous enamel coatings can be produced by dispersing enamel frit in such organic liquids which do not only prevent the formation of active hydroxyl groups but which, in addition, produce upon firing such residual compounds which promote the adherence of fused enamel frit to metal bases while blending therewith.

In accordance with my present invention, I disperse vitreous enamel frit in organic silicon compounds which are liquid, anhydrous and stable at ordinary room temperatures. When an enamel frit is milled with such organic silicon compounds or dispersed therein in the total absence of water, the alkaline compounds, generated by the frit, do not form electrolytes with the silicon compounds, the latter being practically non-conducting in anhydrous form. When such an organosol, consisting of finely divided frit in organic silicon compounds, is applied to iron or steel plates, these plates are not corroded. Therefore, the enamel coatings do not become mottled on firing and the formation of a pure, white coating, for example, is assured. In addition, the silica formed upon firing the enamel slip onto the metal base promotes the adherence of the enamel to said base.

I have found that all such organic silicon compounds may be used which are liquid and stable at ordinary room temperatures, or which are solid and soluble in other liquid, organic liquids. Thus, I may use aliphatic, carbocyclic and heterocyclic silicon compounds having the aforementioned properties. The following table depicts a number of organic silicon derivatives which may serve as liquid phases in the production of vitreous enamel organosols.

duced which resists the action of acids such as contained in lemon juice, for example. These acid-resistant enamels, the so-called "stainless" enamels, are low in, or entirely free from, alumina and high in silica content (up to 50% silica). These stainless enamels will rapidly settle their solid phases in water due to large amounts of alkaline compounds dissolving from the frit particles. Finally, the clay-enamel suspension becomes thinner and thinner, and the solid phases settle to a dense, hard mass. In addition, when such slips are applied to iron or steel bases, they rust these metals in very short periods of time, and it becomes impossible to produce a clear one-coat enamel on iron or steel, etc. In order to produce a clear white coating of enamel, for example, on metal or steel, it is necessary to fuse several layers of white enamel onto these metals to camouflage the rust spots of the first enamel coating.

I am well aware that attempts have, heretofore, been made to overcome the tendency of stainless enamels to rust iron and steel bases to which they are applied. U. S. Patent No. 1,785,777 to Kinzie of December 23, 1930, for example, discloses the addition of titanium sulphate to stainless enamel slips to neutralize the alkalis generated by the same. However, this method does not allow complete prevention of rust formation on iron and steel, and it is necessary to form at least two coatings of enamel on such Table

| Compound | Structural formula | Boiling point degrees C. |
|---|---|---|
| Tetramethyl-monosilane | $(CH_3)_4Si$ | 30-31 |
| Triethyl-monosilane | $(C_2H_5)_3SiH_3$ | 107 |
| Tetraethyl-monosilane | $(C_2H_5)_4Si$ | 151-153 |
| Triethyl-chlorethyl-monosilane | $(C_2H_5)_3Si.C_2H_4Cl$ | 185 |
| Triethyl-oxyethyl-monosilane | $(C_2H_5)_3Si.C_2H_4.OH$ | 190 |
| Triethyl-acetoxyethyl-monosilane | $(C_2H_5)_3SiC_2H_4.O.CO.CH_3$ | 208-214 |
| Tripropyl-monosilane | $(CH_3.CH_2.CH_2)_3SiH$ | 170-171 |
| Tetrapropyl-monosilane | $(CH_3.CH_2.CH_2)_4Si$ | 213-214 |
| Triisobutyl-monosilane | $((CH_3)_2CH.CH_2)_3SiH$ | 204-206 |
| Isoamyl-monosilane | $(C_5H_{11})_3SiH$ | 245 |
| Tetraisoamyl-monosilane | $(C_5H_{11})_4Si$ | 275-279 |
| Triethyl-monosilanol | $(C_2H_5)_3Si$ | 154 |
| Triethyl-monosilanol-ethyl-ester | $(C_2H_5)_3Si.O.C_2H_5$ | 153 |
| Triethyl-monosilanol-acetate | $(C_2H_5)_3Si.O.CO.CH_3$ | 168 |
| Silicoheptyl bromide | $(C_2H_5)_3SiBr$ | 161 |
| Silicoheptyl oxide | $(C_2H_5)_3Si.O.Si(C_2H_5)_3$ | 231 |
| Propyl-monosilanol | $CH_3.CH_2.CH_2.SiH_2.OH$ | 230 |
| Tripropyl-monosilanol | $(CH_3.CH_2.CH_2)_3Si.OH$ | 206-208 |
| Tripropyl-monosilanol-acetate | $(CH_3.CH_2.CH_2)_3Si.O.CO.CH_3$ | 212-216 |
| Tripropyl-monosilyl-bromide | $(CH_3.CH_2.CH_2)_3SiBr$ | 213 |
| Bis-(tripropyl-monosilyl)-ether | $((CH_3.CH_2.CH_2)_3Si)_2O$ | 280-290 |
| Triisoamyl-monosilanol | $(C_5H_{11})_3Si.OH$ | 269-270 |
| Triisoamyl-monosilyl-bromide | $(C_5H_{11})_3SiBr$ | 278-280 |
| Bis-(triisoamyl-monosilyl)-ether | $(C_5H_{11})_3Si.O.Si(C_5H_{11})_3$ | 360-370 |
| Diethyl-silicon | $(C_2H_5)_2Si.O.Si(C_2H_5)_2$ | 300 |
| Silico-diethyl-ether | $(C_2H_5)_2Si(O.C_2H_5)_2$ | 155.8 |
| Silico-chloro-silico-ethoxy-diethyl-monosilane | $(C_2H_5)_2SiCl.O.C_2H_5$ | 146-148 |
| Diethyl-silico-dichloride | $(C_2H_5)_2SiCl_2$ | 128-130 |
| o-Silicoacetic acid-triethyl ester | $CH_2.Si(O.C_2H_5)_3$ | 146-151 |
| o-Silicoacetic acid-trimethyl ester | $CH_2.Si(O.CH_3)_3$ | Undetermined |
| o-Silicopropionic acid-trimethyl ester | $C_2H_4.Si(O.CH_3)_3$ | 125-126 |
| o-Silicopropionic acid-triethyl ester | $C_2H_4.Si(O.C_2H_5)_3$ | 158-159 |
| o-Silicopropionic acid-trichloride | $C_2H_4.SiCl_3$ | 97-103 |
| o-Silicobutyric acid-trichloride | $CH_3.CH_2.CH_2.SiCl_3$ | 123-125 |
| o-Silicoisocaproic acid-triethyl-ester | $CH_3.CH_2.CH_2.Si(O.C_2H_5)_3$ | 195-200 |
| Hexaethyl-disilane | $(C_2H_5)_3Si.Si(C_2H_5)_3$ | 250-253 |
| Propyl-monosilandiol | $CH_3.CH_2.CH_2.SiH(OH)_2$ | 152-154 |
| Isobutyl-monosilandiol | $(CH_3)_2CH.CH_2.SiH.SiH(OH)_2$ | 168-170 |
| Trichloro-ethyl-monosilane | $C_2H_5Cl_3Si:C_2H_5.SiCl_3$ | 99.4-100.5 |
| Trichloro-propyl-monosilane | $C_3H_7Cl_3Si:CH_3.CH_2.SiCl_3$ | 124.5-125 |
| Trichloro-butyl-monosilane | $C_4H_9Cl_3Si:CH_3.CH_2.CH_2.SiCl_3$ | 148-149 |
| Trichloro-isobutyl-monosilane | $C_4H_9Cl_3Si:(CH_3)_2CH.CH_2.SiCl_3$ | 138-143 |
| Trichloro-isoamyl-monosilane | $C_5H_{11}Cl_3:C_5H_{11}.SiCl_3$ | 56 |
| Hexamethyl-disilane | $(CH_3)_3Si.Si(CH_3)_3$ | 112-114 |
| Phenylsilicon chloride | $C_6H_5.SiCl_3$ | 197 |
| Phenylsilicon-triethyl ester | $(C_6H_5).Si(OC_2H_5)_3$ | 235 |
| Silicobenzoic acid | $C_6H_5.SiO.OH$ | 127 |
| Silicon triethyl-triphenyl | $(C_6H_5).Si(C_2H_5)_3$ | 150-165 |
| Silicon triethyl-phenyl-chloride | $C_{12}H_{19}ClSi$ | 260-265 |
| Silicon diphenyl-chloride | $(C_6H_5)_2SiCl_2$ | 230-237 |
| Silicon triphenyl-chloride | $(C_6H_5)_3SiCl$ | 88-89 |
| p-Silicon tolyl-chloride | $CH_3.C_6H_4.SiCl_3$ | 218-220 | and other aliphatic and aromatic silicon derivatives having the characteristics set forth above.

In recent years, vitreous enamel has been produced metals to overcome the mottling effect of stainless enamel. Yet, I have found that it is possible to form a single, white enamel coating on iron and steel provided the frit particles are not suspended in aqueous media but in anhydrous, organic silicon compounds. Although it is possible to disperse the frit in such silicon compounds without any further additions thereto, I have found that the settling of the frit particles may be prevented for relatively long periods of time with the assistance of suitable protective colloids. Naturally, it is impossible to use such protective colloids which act in a hydrated form, such as gelatine, agar, alginates, etc., but I have found that oil-soluble soaps, such as barium, strontium, magnesium soaps, etc., produced by causing a metal salt to react with fatty acids, will effectively assist the floating of stainless enamels in organic silicon compounds. In addition, soaps formed by chemical interaction of naphthenic acids with metal salts are suitable protective colloids for the aforementioned purpose. However, I wish to emphasize that only such soaps can be used which are somewhat soluble in organic silicon compounds. The use of such protective colloids is naturally not limited to stainless enamel frits since any enamel frit will remain in suspension for longer periods of time in the presence of such colloids.

The amounts of vitreous enamel frit to be milled with or suspended in a given amount of a liquid organic silicon compound may be varied at will to form more or less viscous organosols to which clay, protective colloids, etc. may be added. Solid organic silicon derivatives may be dissolved in liquid ones, or they may be dissolved and/or emulsified with other stable, organic liquids, such as hydrocarbons, vegetable, mineral oils, etc., these liquids being called "inert diluents". The finished organosols may be applied to metal bases, etc., by spraying or dipping. Before firing, the moist enamel layer is air-dried. This drying is preferably carried out in chambers which allow recovery of the vapors of the silicon derivatives by condensation, absorption, etc.

I desire to point out that all ingredients of my vitreous enamel organosols must be anhydrous, i. e., free from water, to prevent the formation of metal-corroding ions. Modifications of my process will readily be recognized by those skilled in the art, and I desire to include all such modifications falling within the scope of the appended claims.

I claim:

1. An organosol comprising a finely divided vitreous enamel frit uniformly dispersed in a liquid organic silicon compound, said compound being anhydrous and stable at ordinary room temperatures.

2. An organosol comprising a finely divided vitreous enamel frit uniformly dispersed in a liquid aliphatic silicon compound, said compound being anhydrous and stable at ordinary room temperatures.

3. An organosol comprising a finely divided vitreous enamel frit uniformly dispersed in a liquid aromatic silicon compound, said compound being anhydrous and stable at ordinary room temperatures.

4. An organosol comprising a finely divided vitreous enamel frit uniformly dispersed in a liquid alkyl derivative of silicon, said derivative being anhydrous and stable at ordinary room temperatures.

5. An organosol comprising a finely divided enamel frit dispersed in anhydrous tetraethyl-monosilane.

6. An organosol comprising a finely divided vitreous enamel frit uniformly dispersed in a liquid organic silicon compound and an organic diluent, said compound and said diluent being anhydrous and stable at ordinary room temperatures.

7. An organosol comprising a finely divided vitreous enamel frit uniformly dispersed in a liquid aliphatic silicon compound and an organic diluent, said compound and said diluent being anhydrous and stable at ordinary room temperatures.

8. An organosol comprising a finely divided vitreous enamel frit uniformly dispersed in a liquid aromatic silicon compound and an organic diluent, said compound and said diluent being anhydrous and stable at ordinary room temperatures.

9. An organosol comprising a finely divided vitreous enamel frit uniformly dispersed in a liquid alkyl derivative of silicon and an organic diluent, said derivatives and diluent being anhydrous and stable at ordinary room temperatures.

10. An organosol comprising a finely divided vitreous enamel frit uniformly dispersed anhydrous tetraethyl-monosilane, said tetraethyl-monosilane being diluted with an anhydrous organic liquid.

11. An organosol comprising a finely divided vitreous enamel frit uniformly dispersed in a liquid organic silicon compound with a soap of the group consisting of heavy metal soaps and naphthenic acid soaps, said compound and soap being anhydrous and stable at ordinary room temperatures.

12. An organosol comprising a finely divided vitreous enamel frit uniformly dispersed in a liquid aliphatic silicon compound with a soap of the group consisting of heavy metal soaps and naphthenic acid soaps, said compound and soap being anhydrous and stable at ordinary room temperatures.

13. An organosol comprising a finely divided vitreous enamel frit uniformly dispersed in a liquid aromatic silicon compound with a soap of the group consisting of heavy metal soaps and naphthenic acid soaps, said compound and soap being anhydrous and stable at ordinary room temperatures.

14. An organosol comprising a finely divided vitreous enamel frit uniformly dispersed in a liquid alkyl derivative of silicon, with a soap of the group consisting of heavy metal soaps and naphthenic acid soaps, said derivative and soap being anhydrous and stable at ordinary room temperatures.

15. An organosol comprising a finely divided vitreous enamel frit uniformly dispersed in anhydrous tetraethyl-monosilane with the assistance of an anhydrous soap of the group consisting of heavy metal soaps and naphthenic acid soaps, said soap being stable at ordinary room temperatures.

RUDOLPH S. BLEY.